United States Patent [19]

Cannon

[11] Patent Number: 5,332,904
[45] Date of Patent: Jul. 26, 1994

[54] BROADBAND RADIOMETER

[75] Inventor: Theodore W. Cannon, Golden, Colo.

[73] Assignee: The United States of America as represented by the Department of Energy, Washington, D.C.

[21] Appl. No.: 967,481

[22] Filed: Oct. 28, 1992

[51] Int. Cl.$^5$ .............................................. G01J 5/06
[52] U.S. Cl. .................................. 250/372; 250/228; 356/236
[58] Field of Search ..................... 250/338.1, 372, 228; 356/51, 236

[56]  References Cited

U.S. PATENT DOCUMENTS

| | | |
|---|---|---|
| 2,490,011 | 12/1949 | Bird . |
| 3,222,522 | 12/1965 | Birkebak .......................... 250/228 X |
| 3,458,261 | 7/1969 | Bentley et al. ................... 250/228 X |
| 3,562,795 | 2/1971 | Frenk . |
| 3,609,364 | 9/1971 | Paine . |
| 3,825,760 | 7/1974 | Fletcher et al. . |
| 3,896,313 | 7/1975 | Berman et al. . |
| 4,241,258 | 12/1980 | Cholin . |
| 4,588,295 | 5/1986 | Eldering et al. ................ 356/236 X |
| 4,785,336 | 11/1988 | McComb et al. ............... 356/236 X |
| 4,915,500 | 4/1990 | Selkowitz . |
| 5,190,163 | 3/1993 | Anzai et al. ..................... 250/228 X |

FOREIGN PATENT DOCUMENTS

62-54129  3/1987  Japan ................................. 250/372

Primary Examiner—Constantine Hannaher
Assistant Examiner—Edward J. Glick
Attorney, Agent, or Firm—Kenneth Richardson; Thomas G. Anderson; William R. Moser

[57]  ABSTRACT

A broadband radiometer including (a) an optical integrating sphere having a generally spherical integrating chamber and an entry port for receiving light (e.g., having visible and ultraviolet fractions), (b) a first optical radiation detector for receiving light from the sphere and producing an electrical output signal corresponding to broadband radiation, (c) a second optical radiation detector for receiving light from the sphere and producing an electrical output signal corresponding to a predetermined wavelength fraction of the broadband radiation, and (d) an output for producing an electrical signal which is proportional to the difference between the two electrical output signals. The radiometer is very useful, for example, in measuring the absolute amount of ultraviolet light present in a given light sample.

9 Claims, 8 Drawing Sheets

BROADBAND RADIOMETER

CONTRACTUAL ORIGIN OF THE INVENTION

The United States Government has rights in this invention under Contract No. DE-AC02-83CH10093 between the United States Department of Energy and the National Renewable Energy Laboratory, a Division of the Midwest Research Institute.

BACKGROUND OF THE INVENTION

1. FIELD OF THE INVENTION

The present invention relates, generally, to radiometers and, more particularly, to ultraviolet radiometers. Even more particularly, this invention relates to radiometers capable of measuring ultraviolet (UV) radiation in the UVA (320-400 nm), UVB (280-320 nm) and UVC (approximately 100-280 nm) ranges. Specifically, the present invention relates to an improved broadband ultraviolet radiometer exhibiting near flat spectral response over all (or selected portions) of the UVA, B and C.

2. DESCRIPTION OF THE PRIOR ART

There are many situations in which it is necessary or highly desirable to be able to measure the amount of a given wavelength light fraction (e.g., ultraviolet light) which is present in a light beam. For example, in research applications involving the use of electromagnetic optical radiation, the amount of ultraviolet radiation emitted by the source can be critical to the experiments being conducted. Also, in conducting photochemical reactions, the amount of ultraviolet radiation present normally must be known in order to properly quantify the reactions.

In certain medical applications where electromagnetic radiation is used it is also important to know the amount of ultraviolet radiation present. In various photovoltaic apparatus (e.g., solar cells) it is important to know the amount of ultraviolet radiation to which such apparatus is being exposed. Another common situation involves sun bathers and other persons who are outside during daylight hours and who are being exposed to harmful ultraviolet rays. Knowing the amount of ultraviolet radiation they are being exposed to would be very helpful so as to enable such persons to know the type and amount of sun screen lotion to apply to their exposed skin, for example.

The amount of solar ultraviolet radiation is a measure of the amount of ozone depletion in the earth's atmosphere. Such measurements at a number of global sites are urgently needed in order to assess the amount and global distribution of this depletion.

Various devices have been previously proposed for measuring ultraviolet radiation present in a light source. However, such devices have not been entirely accurate or satisfactory for all purposes.

U.S. Pat. No. 2,490,011 (Bird) describes an ultraviolet ray intensity meter which utilizes two vacuum photocells in a differential combination. The apparatus does not utilize an integrating sphere, nor does it address the requirement for a flat spectral response over the ultraviolet region being measured.

U.S. Pat. Nos. 3,609,364 (Paine); 3,825,760 (Fletcher); and 4,241,258 (Cholin) describe apparatus for detecting ultraviolet rays in the presence of broadband light, as in detecting flames in the presence of background light. The apparatus described in such patents is not an ultraviolet radiometer.

U.S. Pat. No. 3,896,313 (Berman) describes apparatus which is said to be able to detect the presence of ultraviolet light over a discrete wavelength band. Such apparatus does not provide the capability of accurately measuring the amount of ultraviolet radiation present in broadband radiation.

U.S. Pat. No. 3,562,795 (Frenk) describes apparatus for measuring the photometric intensity of one light beam against the photometric intensity of a reference beam. The apparatus does not measure the amount of ultraviolet energy in broadband radiation.

U.S. Pat. No. 4,915,500 (Selkowitz) describes a radiative flux mapping device. Such apparatus is not intended for measuring the amount of ultraviolet energy present in broadband radiation.

There has not heretofore been provided a broadband radiometer which exhibits essentially flat spectral response having the advantages and desirable combination of features which are exhibited by the apparatus and techniques of the present invention.

SUMMARY OF THE INVENTION

It is an object of the invention to provide means for measuring radiation of a desired wavelength range (in-band) in the presence of electromagnetic optical radiation outside the selected wavelength range (out-of-band).

It is another object of the invention to provide means for measuring desired radiation with an essentially flat spectral response as a function of wavelength over the range of wavelengths being measured.

It is yet another object of the invention to provide means for measuring desired radiation with an accurate cosine response.

It is yet another object of the invention to provide means for measuring ultraviolet radiation over a selected wavelength range in the presence of electromagnetic optical radiation outside of the ultraviolet region.

Additional objects, advantages, and novel features of the invention shall be set forth in part in the description that follows and in part will become apparent to those skilled in the art upon examination of the following or may be learned by the practice of the invention. The objects and the advantages of the invention may be realized and attained by means of the instrumentalities and in combinations particularly pointed out in the appended claims.

To achieve the foregoing and other objects and in accordance with the purpose of the present invention, as embodied and broadly described herein, the broadband radiometer may comprise:

(a) an optical integrating sphere having a generally spherical integrating chamber therein; wherein the chamber includes an entry port for receiving light comprising broadband radiation;

(b) first optical radiation detector means adapted to receive light from the sphere; wherein the first detector means (including appropriate filter) detects the broadband radiation comprising the sum of both in-band and out-of-band radiation and produces electrical output signals corresponding to the broadband radiation;

(c) second optical radiation detector means adapted to receive light from the sphere; wherein the second detector means (including appropriate filter) detects the out-of-band radiation only and produces a second electrical output signal corresponding to such out-of-band radiation; and (d) output means for comparing the first and second electrical output signals and being capable of producing a third electrical output signal which is proportional to the difference between the first and second electrical output signals.

Hence, the third electrical output signal is proportional to the in-band component or fraction of the broadband radiation. The "in-band" component or fraction of the broadband radiation is defined herein as the portion or fraction of the broadband radiation which is desired to be measured. The "out-of-band" component is defined herein as the portion or fraction of the broadband radiation which is not desired to be measured. The term "broadband" radiation comprises the sum of the in-band radiation and the out-of-band radiation.

The apparatus may also include display means for displaying the third electrical output signal, such as a recorder or meter.

The apparatus is especially useful for measuring the amount of ultraviolet radiation fraction present in broadband radiation.

Other advantages of the apparatus and techniques of the invention will be apparent from the following detailed description and the accompanying drawings.

BRIEF DESCRIPTION OF THE DRAWINGS

The accompanying drawings, which are incorporated in and form a part of the specification, illustrate the preferred embodiments of the present invention and, with the description, explain the principles of the invention. In the drawings.

DETAILED DESCRIPTION OF THE PREFERRED EMBODIMENTS

Figure 1:
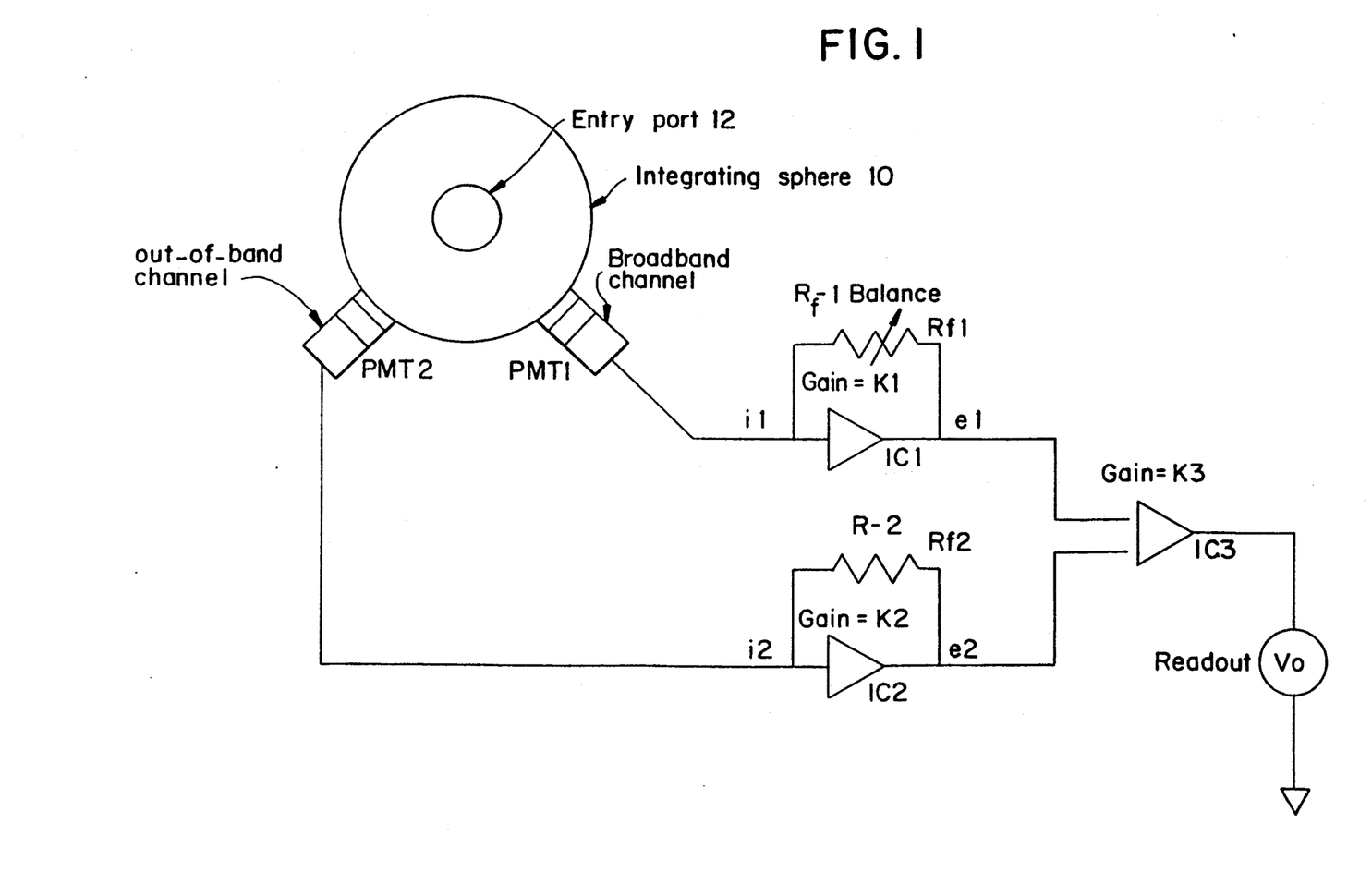
FIG. 1 is a schematic illustrating one embodiment of radiometer apparatus of the invention.
Figure 2:
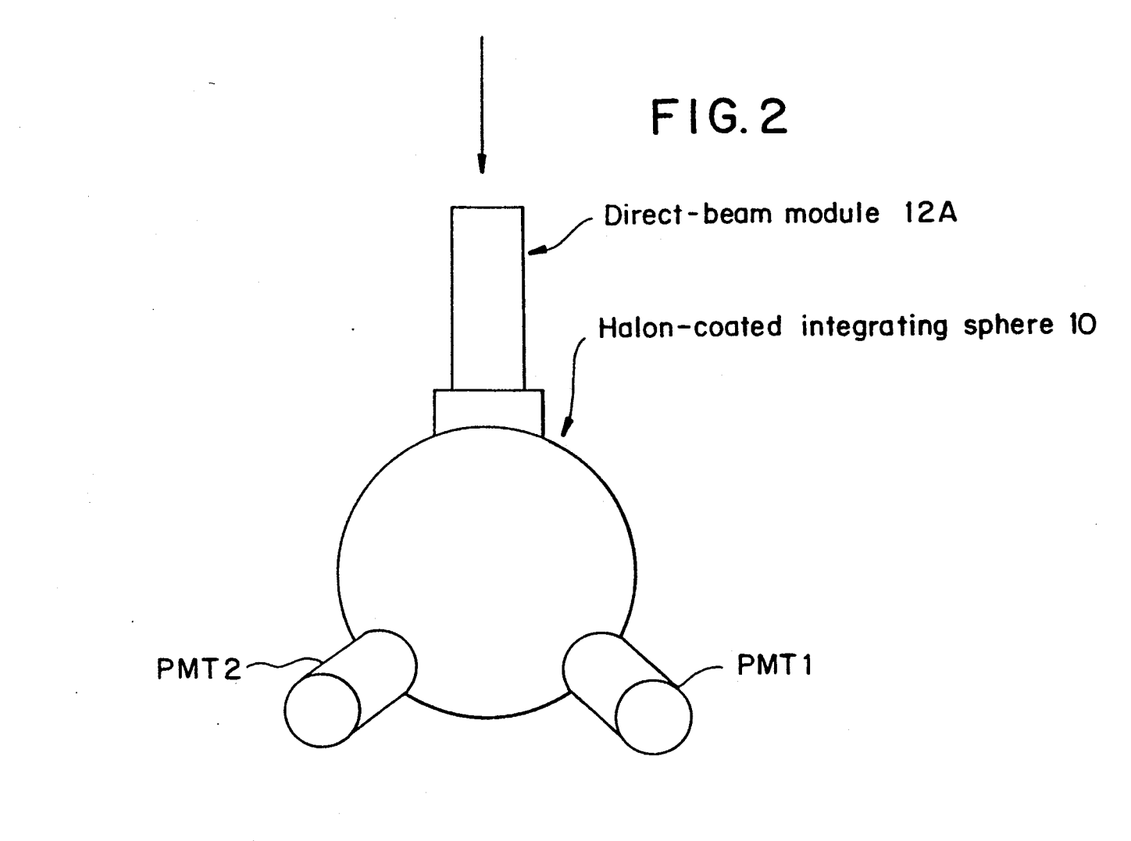
FIG. 2 is a side elevational schematic view of the integrating sphere shown in FIG. 1.

FIGS. 1 and 2 are schematic diagrams illustrating one embodiment of apparatus of the invention comprising an optical integrating sphere 10 having an entry port 12 for radiation to enter the sphere. First and second optical radiation detectors (e.g., photomultiplier tubes (PMT1 and PMT2)) are adapted to receive light (i.e., optical radiation) from the integrating sphere.

The first photomultiplier tube (and associated filter) detects broadband radiation and produces an electrical output signal corresponding to the broadband radiation. The second photomultiplier tube (and appropriate filter) detects out-of-band radiation (i.e., radiation having a wavelength outside the range which is to be measured) and produces an electrical output signal corresponding to the out-of-band radiation.

In FIG. 1 this is illustrated in a situation where the broadband radiation comprises both in-band and out-of-band radiation. PMT1 detects the broadband of radiation, and PMT2 detects only the out-of-band fraction.

The output signal produced by PMT1 is an electrical current which is proportional to the amount of detected radiation (i.e., broadband radiation). The output signal produced by PMT2 is an electrical current which is proportional to the amount of radiation it detects (i.e., out-of-band radiation).

In a preferred embodiment, the signals produced by PMT1 and PMT2 are electrical currents i1 and i2 which are received by separate operational amplifiers IC1 and IC2 where the separate currents are converted to separate voltage signals e1 and e2. The voltage signals then are received by a differential amplifier IC3 where the voltages are compared, and a third electrical output signal is generated which is proportional to the difference between the two voltage signals. This output signal can be read by a meter, or it may be connected to a recorder, etc.

As shown in FIG. 1, the circuitry further includes a variable resistor for adjusting the voltage-to-current ratio of amplifier IC1 in a manner such that the electrical output signal is zero in the presence of a predetermined wavelength fraction.

The integrating sphere may be, for example, about 4 to 6 inches in diameter, although other sizes may also be used. The interior surface of the sphere must be coated with a white diffusing material 14 such as Halon (a commercially-available material). This is illustrated in FIG. 3.

Figure 3:
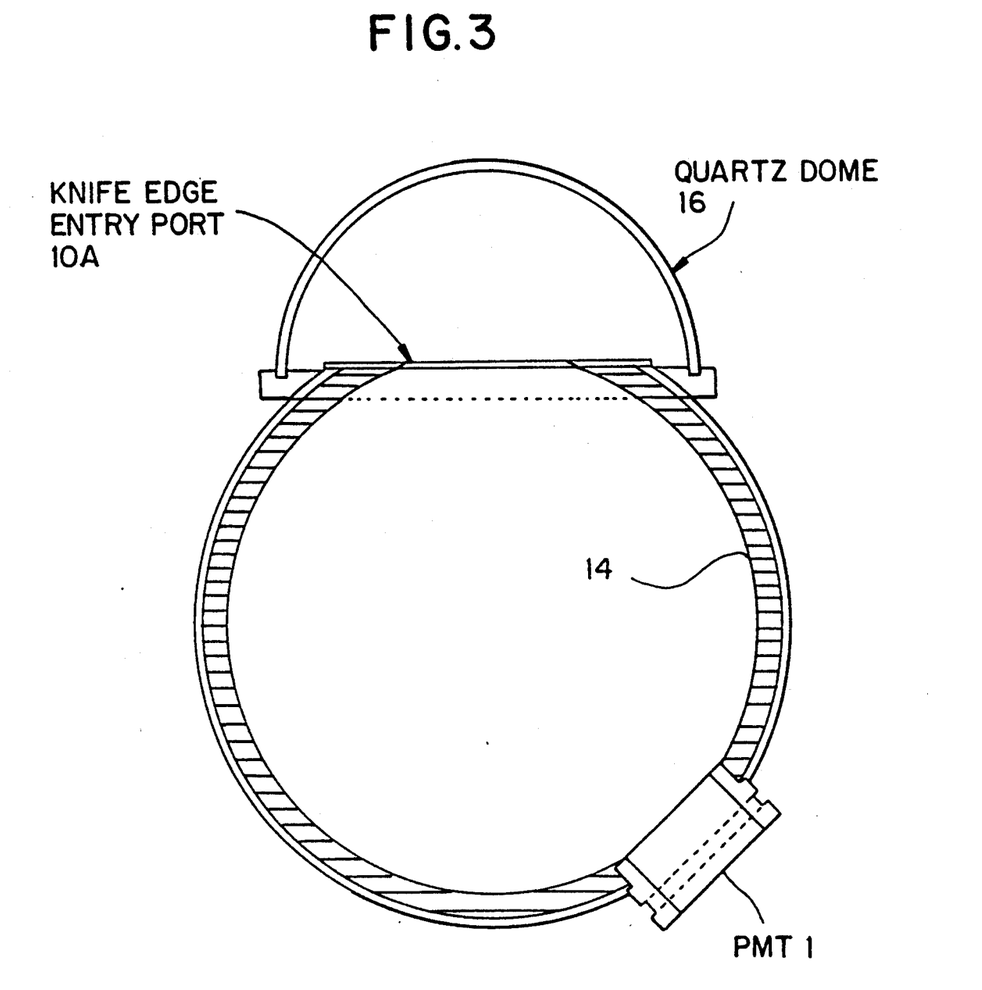
FIG. 3 is a cross-sectional view of one embodiment of integrating sphere which may be used in this invention.

It is also preferable for the peripheral edge of the entry port to have a knife edge 10A as shown in FIG. 3 so that the light entering the sphere through the entry port is not reflected or diffused by the entry port itself.

For measuring direct-beam radiation only (excluding diffuse radiation), the radiation may enter the entry port through an elongated tube 12A (as illustrated in FIG. 2). For measuring global radiation (i.e., direct and diffuse radiation), the radiation enters the integrating sphere through a quartz dome 16 which is a radiation transparent hemisphere (as illustrated in FIG. 3).

The photomultiplier tubes used should be of the same type. Separate light filters, however, are placed on each photomultiplier tube so as to filter out the appropriate radiation. Thus, if the first detector or photomultiplier tube is to detect all fractions of the incoming radiation, then no filters may be needed on it. The other detector or photomultiplier tube would include filters to screen out radiation of the wavelength range which is desired to be measured. Then when the outputs of the two photomultiplier tubes are compared, it is possible to determine the amount of the particular radiation which is of interest.

When measuring the amount of UV radiation in a source of broadband radiation, one may use photomultiplier tubes having near flat spectral response from 240 nm to 600 nm, such as those from Hamamatsu, Model 552S. Other equivalent means could also be used, of course.

The optical integrating sphere used in this invention is essential because it removes spatial inhomogenetics from the light beam source while providing a cosine response, which is an especially important consideration when viewing off-axis radiation as in the case of solar global radiation measurements, where a significant component of the ultraviolet radiation is diffuse.

Figure 4:
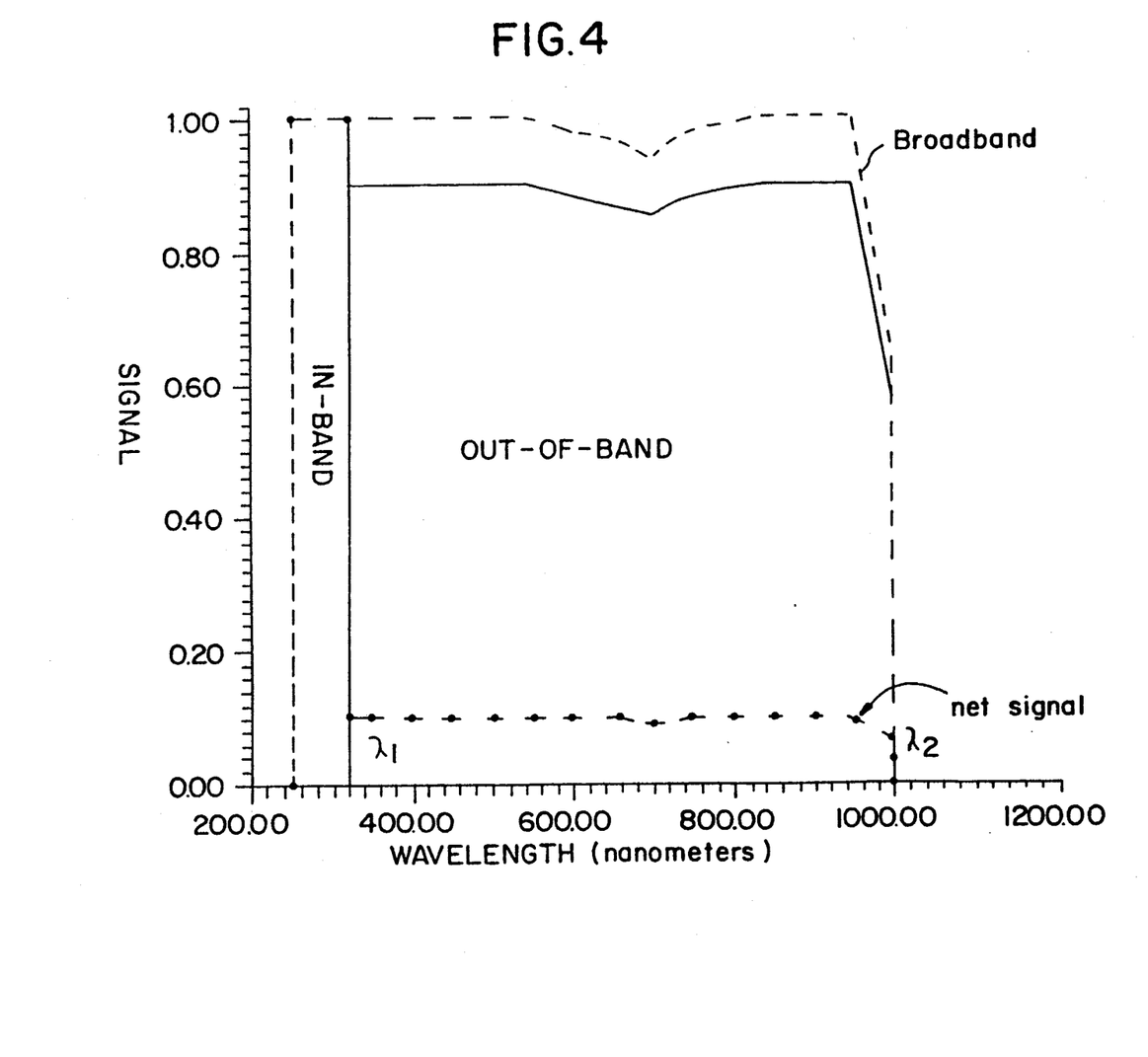
FIG. 4 is a graph showing superimposed curves of the channel 1 (broadband, i.e., in-band plus out-of-band) and channel 2 (out-of-band) response functions of the apparatus of FIG. 1 without balancing.
Figure 5:
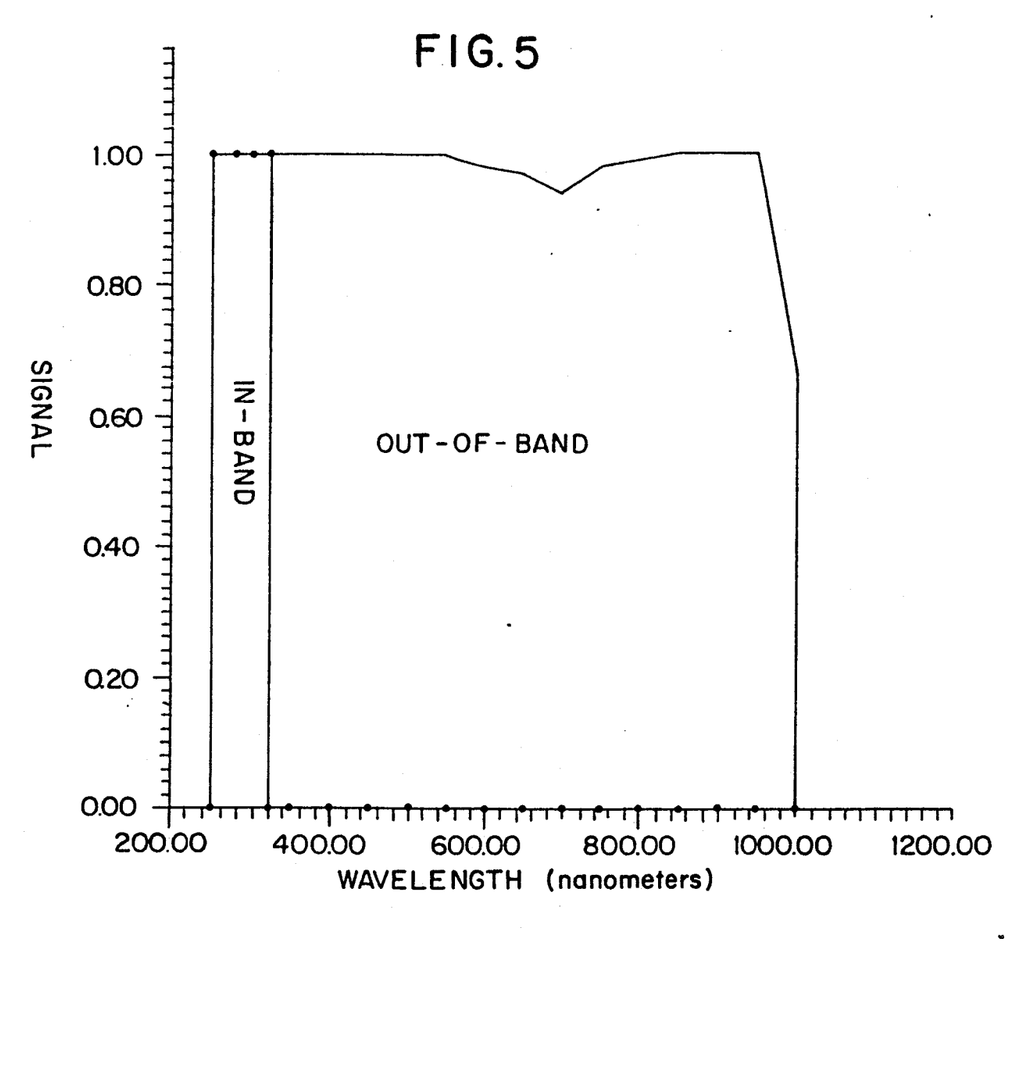
FIG. 5 is a curve resulting after the two channels are balanced to zero.

FIG. 4 is a graph showing superimposed curves of the broadband signal (i.e., comprising both in-band and out-of-band fractions) and the out-of-band signal using the apparatus of FIG. 1 without balancing. The value of $R_f$ may be varied such that the net out-of-band signal is balanced to null. This is illustrated in the curve of FIG. 5.

Figure 6:
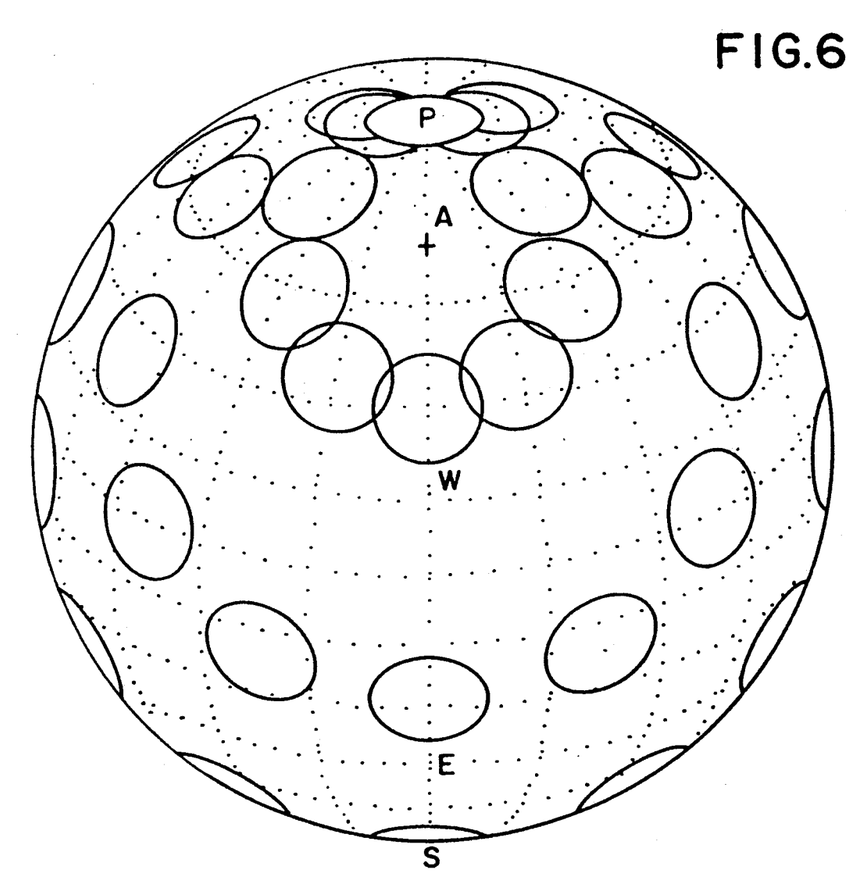
FIGS. 6, 7 and 8 are schematic views illustrating the relationship of the optical radiation detector means to the solar paths inside the integrating sphere at winter solstice (W), summer solstice (S) and the two equinoxes (E).
Figure 7:
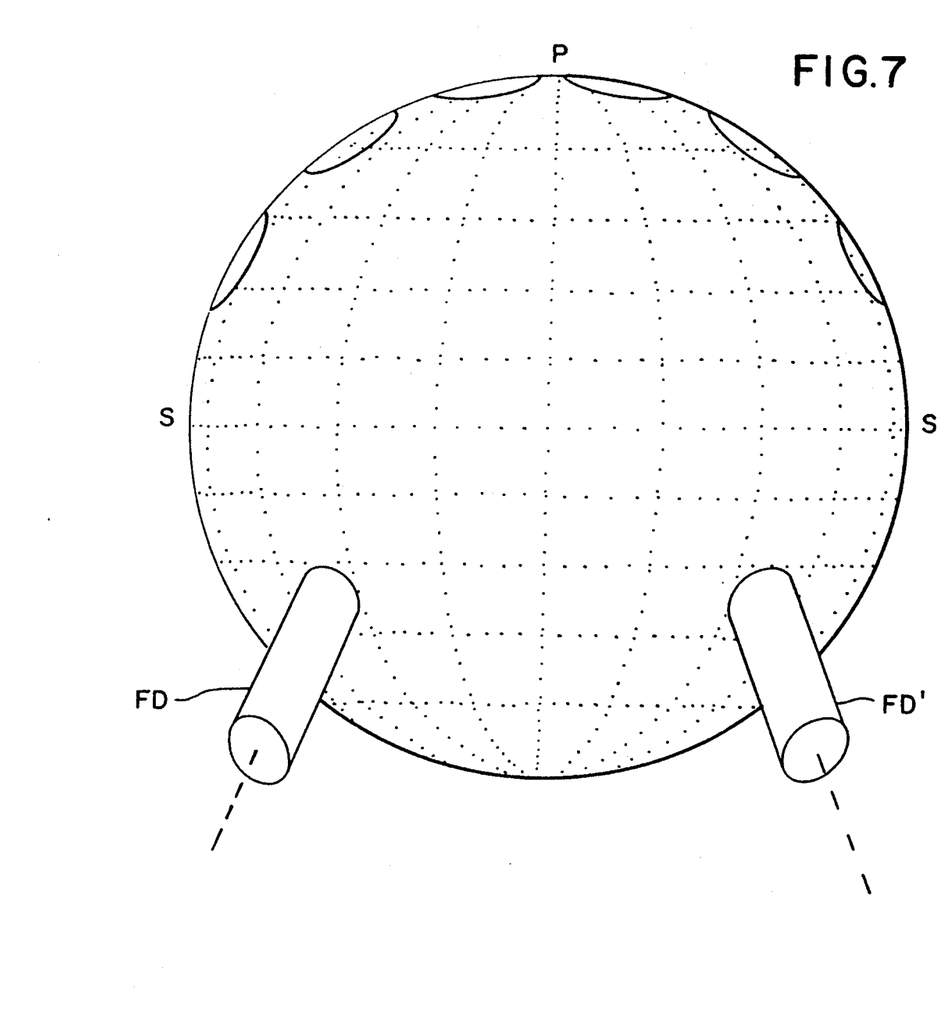
Figure 8:
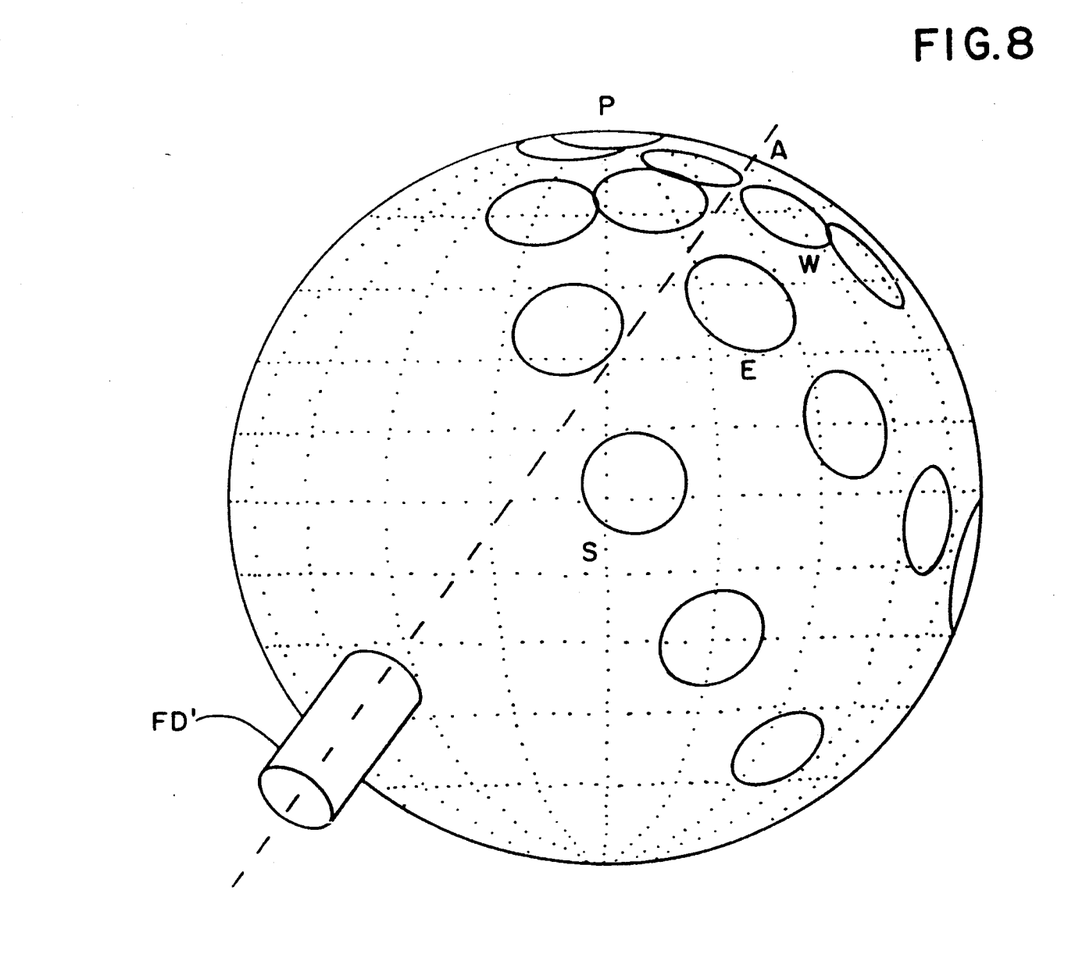

FIGS. 6-8 illustrate the relationship of the optical radiation detector means (i.e., filter detectors) to the solar paths inside the integrating sphere at different times of the year. The detectors are positioned and oriented such that they are aimed at point A on the inside of the integrating sphere (i.e., a point where the solar image entering entry port P never touches).

In FIG. 6 there is shown the north-facing half of the integrating sphere showing solar-image trajectories for winter (W) and summer (S solstices and the two equinoxes (E), and aim point (A) for the filter-detector combinations. The sphere is viewed from 30 degrees above center for clarity.

In FIG. 7 there is shown the south-facing half of the integrating sphere showing a partial solar image trajectory for the summer solstice (S—S'), entrance port (P) and the two filter-detectors (FD, FD'). The sphere is viewed looking directly at the center.

In FIG. 8 there is shown the east-facing half of the integrating sphere showing partial solar-image trajectories (W, E, S), entrance port (P) and southeast filter-detector combination (FD'). The sphere is viewed looking directly at the center.

The optical radiation detector means which may be used in this invention may be any type of detector which is capable of detecting the necessary radiation. The detector may be a solid state device, photomultiplier tube, or any equivalent means. Appropriate radiation filters may be used in combination with the detector means, as necessary.

The foregoing is considered as illustrative only of the principles of the invention. Further, because numerous modifications and changes will readily occur to those skilled in the art, it is not desired to limit the invention to the exact construction and operation shown and described, and accordingly all suitable modifications and equivalents may be resorted to falling within the scope of the invention as defined by the claims which follow.

As an additional variation, it is possible to prefilter the radiation by adding a short-wavelength pass filter to the direct beam module or to incorporate a short pass filter into the quartz dome.

The embodiments of the invention in which an exclusive property of privilege is claimed are defined as follows:

1. A broadband radiometer comprising:
   (a) an optical integrating sphere having a generally spherical integrating chamber therein; wherein said chamber includes an entry port for receiving light comprising broadband radiation;
   (b) first optical radiation detector means adapted to receive light from said sphere; wherein said first detector means detects said broadband radiation and produces a first electrical output signal comprising a first electrical current corresponding to said broadband radiation;
   (c) second optical radiation detector means adapted to receive light from said sphere; wherein said second detector means detects a predetermined wavelength fraction of said broadband radiation and produces a second electrical output signal comprising a second electrical current corresponding to said wavelength fraction; and
   (d) output means comprising a differential amplifier for comparing said first and second electrical output signals and being capable of producing a third electrical output signal which is proportional to the difference between said first and second electrical output signals;
   (e) first and second operational amplifiers; wherein said first amplifier converts said first electrical current to a first voltage signal which is proportional to said first electrical current; and wherein said second amplifier converts said second electrical current to a second voltage signal which is proportional to said second electrical current; and
   (f) a variable resistor for adjusting the voltage-to-current ratio of said first amplifier in a manner such that said third electrical output signal is zero in the presence of said predetermined wavelength fraction.

2. A radiometer in accordance with claim 1, wherein said entry port of said integrating chamber includes a knife edge.

3. A radiometer in accordance with claim 1, further comprising display means for displaying said third electrical output signal.

4. A radiometer in accordance with claim 1, wherein said first detector means detects visible light and ultraviolet light, and wherein sad second detector means detects visible light.

5. A radiometer in accordance with claim 1, wherein each said optical radiation detector means comprises a photomultiplier tube.

6. A broadband ultraviolet radiometer comprising:
   (a) an optical integrating sphere having a generally spherical integrating chamber therein; wherein said chamber includes an entry port for receiving light comprising visible and ultraviolet light fractions;
   (b) first optical radiation detector means adapted to receive light from said sphere; wherein said first detector means detects said visible light and said ultraviolet light fractions and produces a first electrical output signal corresponding to said visible light and said ultraviolet light; wherein said first electrical output signal comprises a first electrical current;
   (c) second optical radiation detector means adapted to receive light from said sphere; wherein said second detector means detects said visible light fraction and produces a second electrical output signal corresponding to said visible light; wherein said second electrical output signal comprises a second electrical current;
   (d) a first operational amplifier for converting said first electrical current to a first voltage signal;
   (e) a second operational amplifier for converting said second electrical current to a second voltage signal; and
   (f) output means comprising a differential amplifier for comparing said first and second voltage signals and producing a third electrical output signal which is proportional to the difference between said first and second voltage signals; and
   (g) a variable resistor for adjusting the voltage-to-current ratio of said first amplifier in a manner such that said third electrical output signal is zero in the presence of light having a wavelength outside said ultraviolet light fraction.

7. A radiometer in accordance with claim 6, wherein said entry port of said integrating chamber includes a knife edge.

8. A radiometer in accordance with claim 6, further comprising display means for displaying said third electrical output signal.

9. A radiometer in accordance with claim 6, wherein each said optical radiation detector means comprises a photomultiplier tube.

* * * * *